(12) United States Patent
Pennings et al.

(10) Patent No.: US 11,579,057 B1
(45) Date of Patent: Feb. 14, 2023

(54) AUTOMATED MANDREL BEND TEST

(71) Applicant: Flex Ltd., Singapore (SG)

(72) Inventors: Robert Pennings, San Jose, CA (US); Christian Biederman, Bethlehem, PA (US)

(73) Assignee: Flex, Ltd., Singapore (SG)

( * ) Notice: Subject to any disclaimer, the term of this patent is extended or adjusted under 35 U.S.C. 154(b) by 245 days.

(21) Appl. No.: 16/880,823

(22) Filed: May 21, 2020

Related U.S. Application Data

(60) Provisional application No. 62/852,644, filed on May 24, 2019.

(51) Int. Cl.
    *G01N 3/20*     (2006.01)
    *G01N 3/02*     (2006.01)

(52) U.S. Cl.
    CPC .............. *G01N 3/20* (2013.01); *G01N 3/02* (2013.01); *G01N 2203/0023* (2013.01); *G01N 2203/0037* (2013.01); *G01N 2203/04* (2013.01)

(58) Field of Classification Search
    CPC .... G01N 3/20; G01N 3/02; G01N 2203/0023; G01N 2203/0037; G01N 2203/0058; G01N 2203/0222; G01N 19/04; G01N 3/04; G03B 17/26; G01M 3/2815
See application file for complete search history.

(56) References Cited

U.S. PATENT DOCUMENTS

| | | | | |
|---|---|---|---|---|
| 4,367,641 A | * | 1/1983 | Mizutani | B21D 7/08 72/166 |
| 4,920,779 A | * | 5/1990 | Post | B21F 1/00 72/17.2 |
| 8,616,529 B2 | * | 12/2013 | Kim | B66D 1/50 254/335 |

* cited by examiner

*Primary Examiner* — Brandi N Hopkins
(74) *Attorney, Agent, or Firm* — Haverstock & Owens, A Law Corporation

(57) ABSTRACT

A bend test device and bend test method enable a mandrel bend test to be automatically performed. The bend test device includes a controlled motor, a drive shaft coupled to the motor, a nose piece coupled to the drive shaft, and a nose clamp for securing a device under test (DUT) to the nose piece. A control system connected to the bend test device uses a programmed control algorithm to control the bend test device. The motor is connected to the drive shaft and rotates the drive shaft in response to control signaling provided by the control system. The rotating drive shaft in turn rotates the nose piece. Rotation of the nose piece bends the mounted DUT. The motor rotates the drive shaft as defined by the software parameters and the DUT is bent back and forth across a defined radius edge.

15 Claims, 11 Drawing Sheets

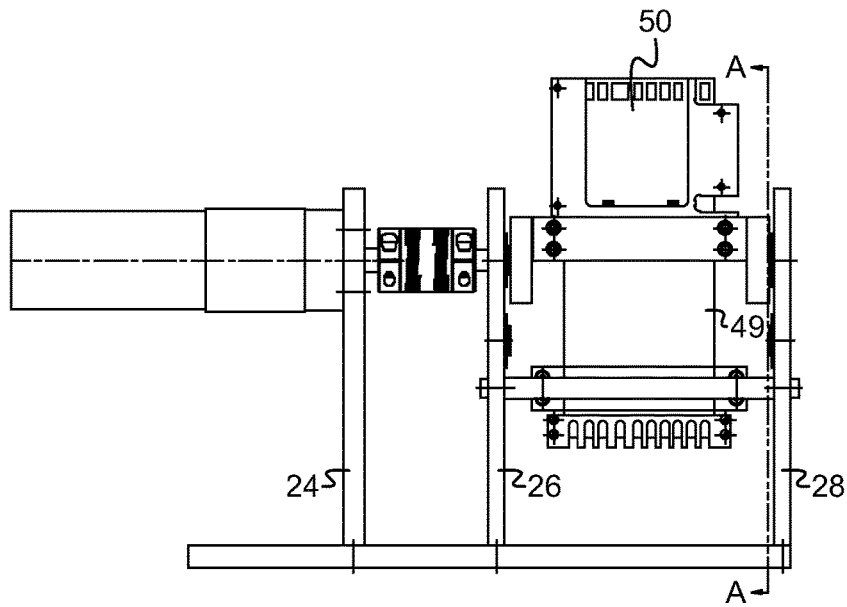
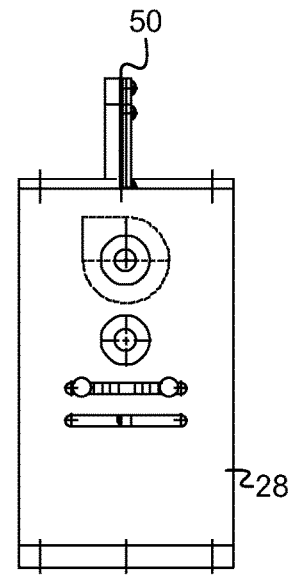
Fig. 5A     Fig. 5B
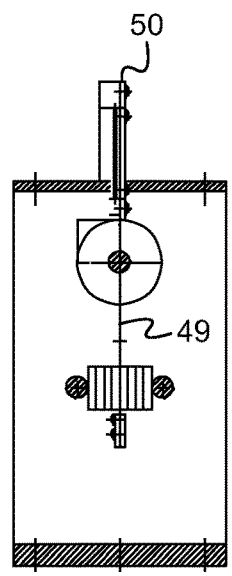
Section A-A
Fig. 5C

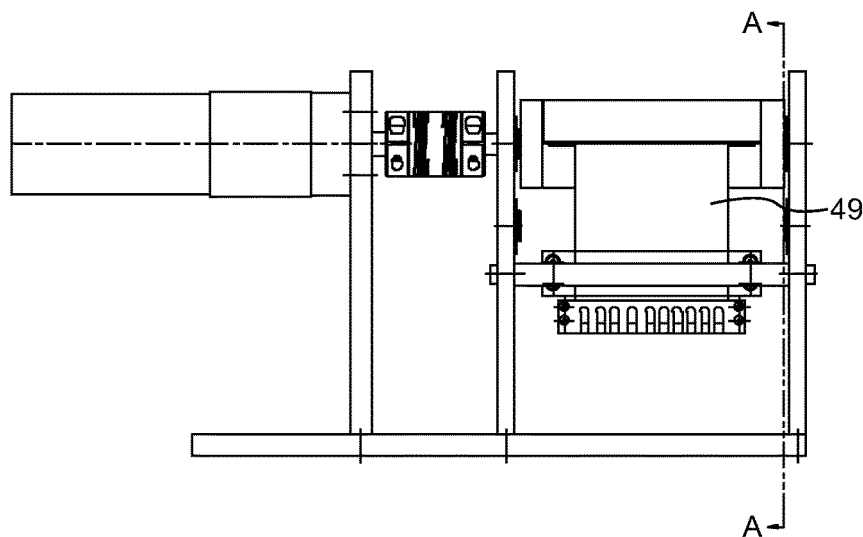
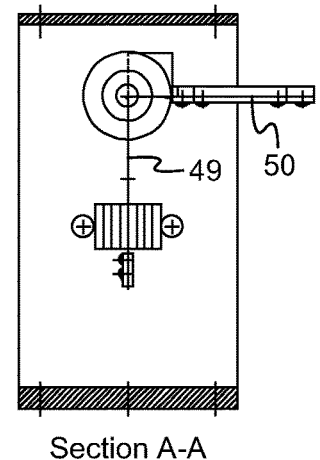
Fig. 6A    Fig. 6B
Section A-A
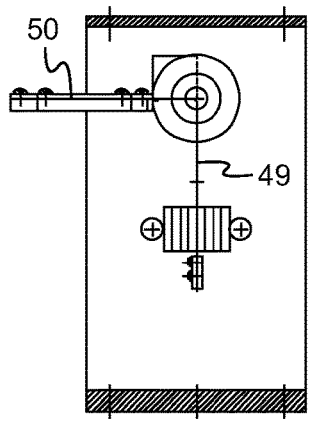
Section A-A
Fig. 6C

//AUTOMATED MANDREL BEND TEST

RELATED APPLICATIONS

This Patent Application claims priority under 35 U.S.C. 119(e) of the U.S. provisional patent application, application Ser. No. 62/852,644, filed on May 24, 2019, and entitled "Automated Mandrel Bend Test", which is hereby incorporated in its entirety by reference.

FIELD OF THE INVENTION

The present invention is generally directed to devices and methods of testing a Device Under Test (DUT). More specifically, the present invention is directed to devices and methods to automate a mandrel bend test.

BACKGROUND OF THE INVENTION

A mandrel bend test is a test that physically bends a DUT up to 90 degrees with a bend radius of 1 millimeter. This test is typically performed on flexible or stretchable electronics, such as a flexible circuit board, using a manual process with each bend taking about 5 seconds. This is a tedious, slow task that requires an operator to perform this test. Manually bending the DUT often also fails to achieve the desired bend radius. There is a need to perform significantly more bends than can be performed manually within a shortened schedule requirement, for example up to 840,000 bends.

SUMMARY OF THE INVENTION

Embodiments are directed to a bend test device and bend test method to automate a mandrel bend test. The bend test device and bend test method enable a mandrel bend test to be automatically performed. Benefits of the bend test device and bend test method include, but are not limited to, increased repeatability and reduced man hours required for testing. A DUT is loaded into the bend test device and the user can set the number of cycles for bending, the number of degrees of the bend, and the speed at which the testing device bends the material. This provides great flexibility to performing various grades of testing in an automated fashion.

The bend test device includes a controlled motor, a drive shaft coupled to the motor, a nose piece coupled to the drive shaft, and a nose clamp for securing the DUT to the nose piece. The bend test device also includes mounting structures for mounting in place the motor, drive shaft, and nose piece and for substantially maintaining a position of the DUT when the bend test is performed. A control system connected to the bend test device uses a programmed control algorithm to control the testing device and determine angular rotation, rotation speed, and number of cycles of the bend test. The control system controls the motor during the bend test. The motor is connected to the drive shaft and rotates the drive shaft in response to control signaling provided by the control system. The rotating drive shaft in turn rotates the nose piece. Rotation of the nose piece bends the mounted DUT. A portion of the DUT hangs below the nose piece with a weight attached to hold tension. The motor rotates the drive shaft as defined by the software parameters and the DUT is bent back and forth across a defined radius edge.

In an aspect, a bend test device is disclosed that includes a motor, a mandrel, a mounting structure, and a device under test. The mandrel is coupled to the motor, wherein the mandrel includes a first radius edge having a defined radius and a second radius edge having the defined radius. The mounting structure is coupled to the motor and to the mandrel. The device under test is coupled to the mandrel. The motor and mandrel are configured to rotate in a first direction and a second direction, when rotated in the first direction the device under test bends over the first radius edge and when rotated in the second direction the device under test bends over the second radius edge. In some embodiments, the device under test is coupled to the mandrel such that a hanging portion of the device under test hangs below the mandrel. In some embodiments, the bend test device further comprises a weight coupled to the hanging portion of the device under test. In some embodiments, the bend test device further comprises a pair of stabilizer rods coupled to the mounting structure, wherein the weight is positioned between the stabilizer rods. In some embodiments, the hanging portion of the device under test and the weight are free-hanging. In some embodiments, the weight maintains a downward tension of the hanging portion of the device under test to enable bending of the device under test to conform to the radius of the first radius edge and the second radius edge of the mandrel. In some embodiments, the mounting structure comprises a first set of openings for mounting the motor and the mandrel, and a second set of openings for mounting the stabilizer rods, further wherein the motor and the mandrel are adjustably positioned by positioning the motor and the mandrel in select ones of the first set of openings, and the stabilizer rods are adjustably positioned by positioning the stabilizer rods in select ones of the second set of openings, wherein the motor, the mandrel, and the stabilizer rods are adjustably positioned to adjust a relative separation distance between the mandrel and the stabilizer rods. In some embodiments, the device under test has a first end and a second end opposite the first end, the hanging portion of the device under test includes the first end, further wherein the device under test is coupled to the mandrel such that the first end extends from a first side of the mandrel and the second end extends from a second side of the mandrel. In some embodiments, the bend test device further comprises a support structure mounted to the second side of the mandrel and to the second end of the device under test. In some embodiments, the mandrel comprises a nose piece and a nose clamp, further wherein the device under test is mounted and secured between the nose piece and the nose clamp. In some embodiments, the motor comprises a drive shaft and the nose piece comprises a bearing coupled to the drive shaft. In some embodiments, the nose piece comprises the first radius edge and the nose clamp comprises the second radius edge. In some embodiments, the device under test is a flexible circuit board. In some embodiments, the bend test device further comprises a control circuit coupled to the motor. In some embodiments, the control circuit comprises control logic for implementing programmed instructions including a first number of degrees to be rotated in the first direction and a second number of degrees to be rotated in the second direction, and a number of bend cycles to be performed.

In another aspect, a bend test device is disclosed that includes a motor, a mandrel, a mounting structure, a pair of stabilizer rods, a device under test, a weight, and a control circuit. The mandrel comprises a nose piece and a nose clamp, wherein the nose piece includes a first radius edge having a defined radius and the nose clamp includes a second radius edge having the defined radius. The mounting structure is coupled to the motor and to the mandrel. The pair of stabilizer rods are coupled to the mounting structure. The device under test is coupled to the mandrel, wherein the device under test is mounted and secured between the nose piece and the nose clamp, and a hanging portion of the device under test hangs below the mandrel. The weight is coupled to the hanging portion of the device under test, wherein the weight is positioned between the stabilizer rods. A control circuit is coupled to the motor. The motor and mandrel are configured to rotate in a first direction and a second direction. When rotated in the first direction the device under test bends over the first radius edge and when rotated in the second direction the device under test bends over the second radius edge. The control circuit comprises control logic for implementing programmed instructions including a first number of degrees to be rotated in the first direction and a second number of degrees to be rotated in the second direction, and a number of bend cycles to be performed.

BRIEF DESCRIPTION OF THE DRAWINGS

Several example embodiments are described with reference to the drawings, wherein like components are provided with like reference numerals. The example embodiments are intended to illustrate, but not to limit, the invention. The drawings include the following figures:

FIG. 5A illustrates a front view of the bend test device of FIG. 3 in the neutral position.

FIG. 5B illustrates a side view of the bend test device of FIG. 5A.

FIG. 5C illustrates a cut-out side view along line A-A in FIG. 5A.

FIG. 6A illustrates a front view of the bend test device in a +90 degree bend position.

FIG. 6B illustrates a cut-out side view along line A-A of the bend test device in the +90 degree bend position.

FIG. 6C illustrates a cut-out side view along line A-A of the bend test device in a −90 degree bend position.

DETAILED DESCRIPTION OF THE EMBODIMENTS

Embodiments of the present application are directed to a bend test device and bend test method. Those of ordinary skill in the art will realize that the following detailed description of the bend test device and bend test method is illustrative only and is not intended to be in any way limiting. Other embodiments of the bend test device and bend test method will readily suggest themselves to such skilled persons having the benefit of this disclosure.

Reference will now be made in detail to implementations of the bend test device and bend test method as illustrated in the accompanying drawings. The same reference indicators will be used throughout the drawings and the following detailed description to refer to the same or like parts. In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1:
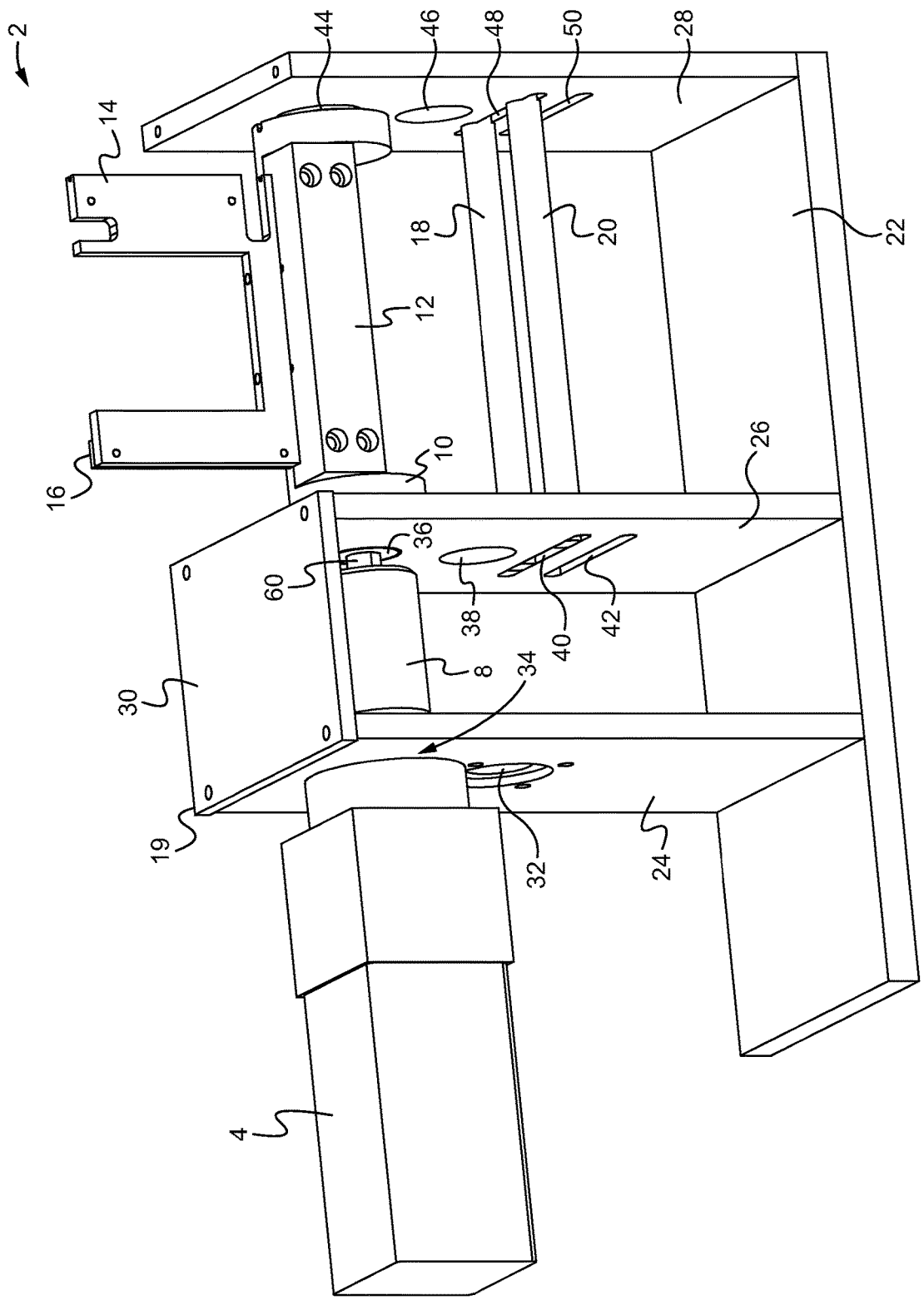
FIG. 1 illustrates a perspective front view of a bend test device according to some embodiments.
Figure 2:
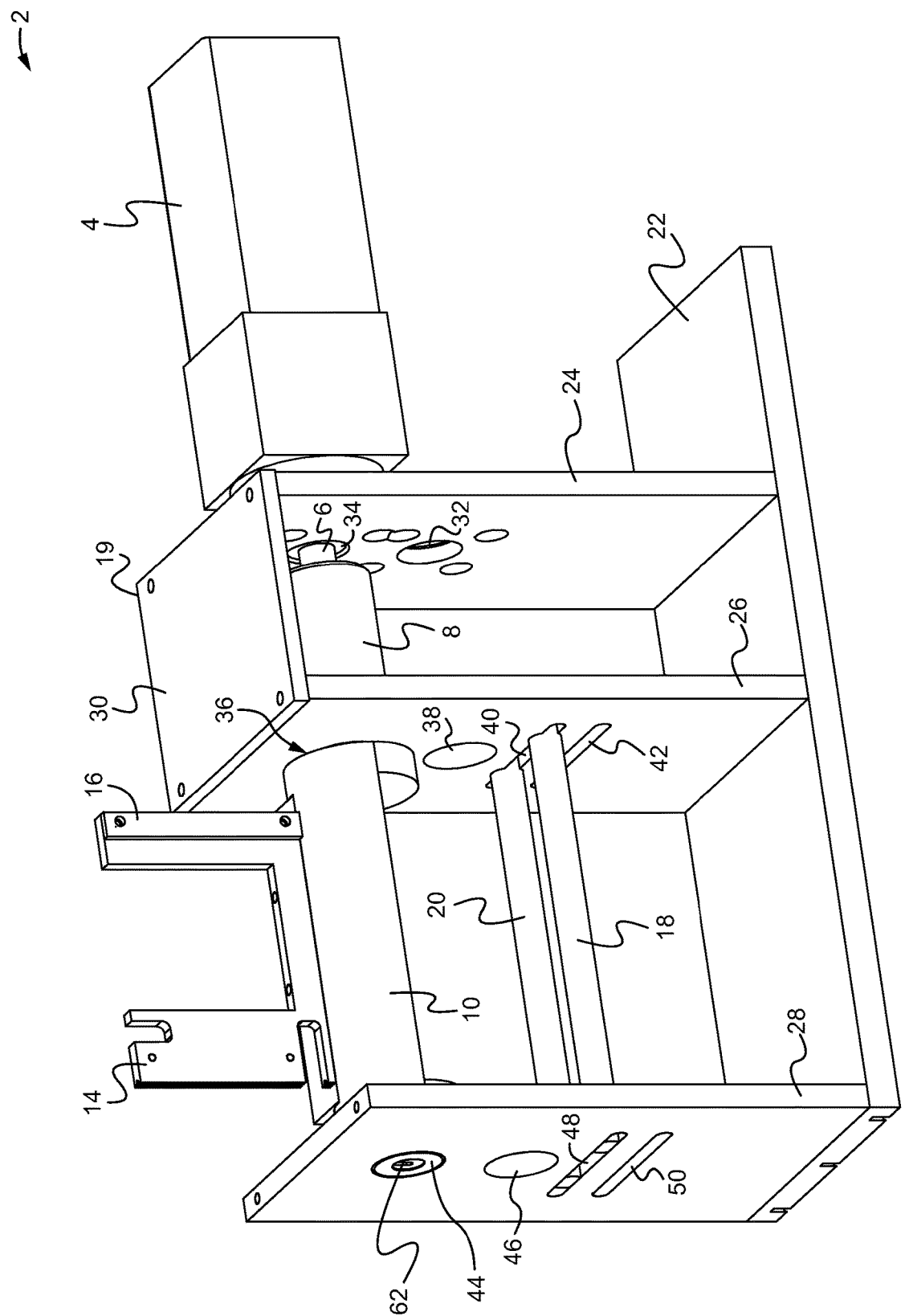
FIG. 2 illustrates a perspective rear view of the bend test device of FIG. 1.

FIG. 1 illustrates a perspective front view of a bend test device according to some embodiments. FIG. 2 illustrates a perspective rear view of the bend test device of FIG. 1. The bend test device 2 includes a motor 4 coupled to a nose piece 10 via a connecting adapter 8. The connecting adapter 8 is coupled to a motor drive shaft 6 (FIG. 2) of the motor 4 and a bearing 60 of the nose piece 10. A nose clamp 12, a front support plate 14, and a rear support clamp 16 (FIG. 2) are attached to the nose piece 10. The bend test device 2 includes a mounting structure 19 for mounting the motor 4 and the nose piece 10. The mounting structure 19 includes a base plate 22, an end support plate 24, a mid support plate 26, an end support plate 28, and a top support plate 30. The end support plate 24 includes an opening 32 and an opening 34. Either opening 32, 34 can be used for both supporting the motor 4 and for providing an opening through which the motor drive shaft 6 passes to connect with the connecting adapter 8. In the exemplary configuration shown in FIG. 1, the motor 4 is mounted at the opening 34. The mid support plate 26 includes an opening 36 and an opening 38. Either opening 36, 38 can be used for both supporting the nose piece 10 and for providing an opening through which the bearing 60 of the nose piece 10 passes to connect with the connecting adapter 8. In the exemplary configuration shown in FIG. 1, the nose piece 10 is mounted at the opening 36. The end support plate 28 includes an opening 44 and an opening 46. Either opening 44, 46 can be used for both supporting the nose piece 10 and for providing an opening through which a bearing 62 (FIG. 2) of the nose piece 10 is positioned. In the exemplary configuration shown in FIG. 1, the nose piece 10 is mounted at the opening 44.

The bend test device 2 also includes stabilizer rods 18 and 20 mounted to the mid support plate 26 and the end support plate 28. The mid support plate 26 includes a slot opening 40 and a slot opening 42. The end support plate 28 includes a slot opening 48 and a slot opening 50. The slot openings 40, 42, 48, 50 are configured to receive an end of each of the stabilizer rods 18, 20. In the exemplary configuration shown in FIG. 1, the stabilizer rods 18, 20 are mounted at the slot opening 40 of the mid support plate 26 and the slot opening 48 of the end support plate 28. In some embodiments, the ends of each stabilizer rod 18, 20 are secured in position within the slot openings 40, 42 of the mid support plate 26 and slot openings 48, 50 of the end support plate 28 by screws, e.g. thumb screws, which can be loosened and re-tightened to enable the position of the stabilizer rods 18, 20 to be laterally adjusted within the slot openings 40, 48, either increasing or decreasing a gap between the stabilizer rods 18, 20.

FIG. 1 shows the motor 4 mounted at the opening 34 of the end support plate 24 and the nose piece 10 mounted at the opening 36 of the mid support plate 26 and the opening 44 of the end support plate 28. The position of the nose piece 10, and therefore the position of the connected motor 4 and the connecting adapter 8 can be adjusted to accommodate differently sized DUTs 50. For example, the motor 4 can be alternatively mounted at the opening 32 of the end support plate 24 and the nose piece 10 can be alternatively mounted at the opening 38 of the mid support plate 26 and the opening 46 of the end support plate 28, thereby lowering a relative position of the nose piece 10, the connecting adapter 8, and the motor 4. It is understood that the end support plate 24, the mid support plate 26, and the end support plate 28 can be configured with additional openings to further enable alternative positioning of the nose piece 10, the connecting adapter 8, and the motor 4. Similarly, a relative position of the stabilizer rods 18, 20 can be adjusted. FIG. 1 shows the stabilizer rods 18, 20 mounted at the slot opening 40 of the mid support plate 26 and the slot opening 48 of the end support plate 28. Alternatively, the stabilizer rods 18, 20 can be alternatively mounted at the slot opening 42 of the mid support plate 26 and the slot opening 50 of the end support plate 28, thereby lowering a relative position of the stabilizer rods 18, 20. It is understood that the mid support plate 26 and the end support plate 28 can be configured with additional slot openings to further enable alternative positioning of the stabilizer rods 18, 20.

Figure 3:
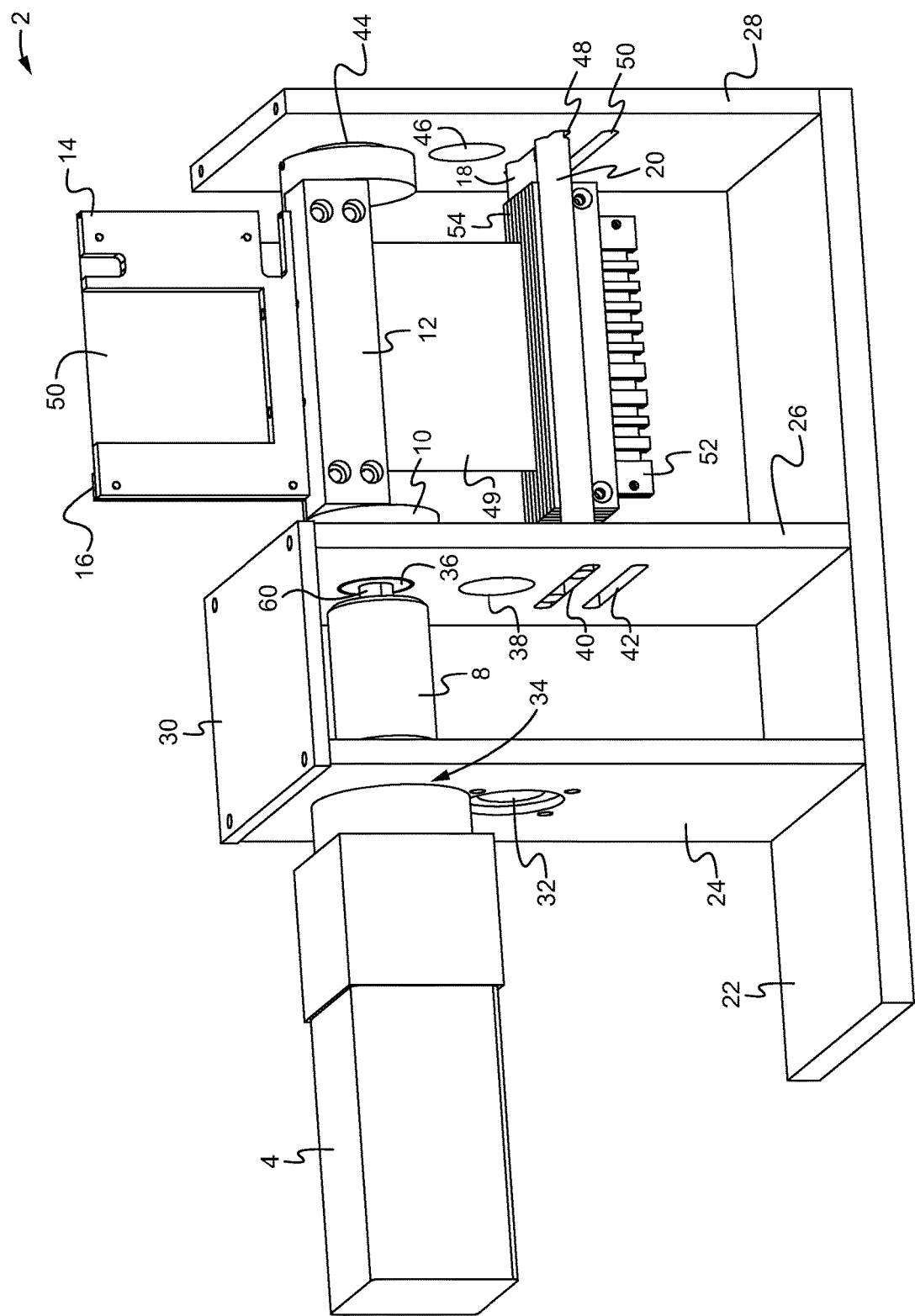
FIG. 3 illustrates a perspective rear view of a DUT mounted to the bend test device of FIG. 1 according to some embodiments.
Figure 4:
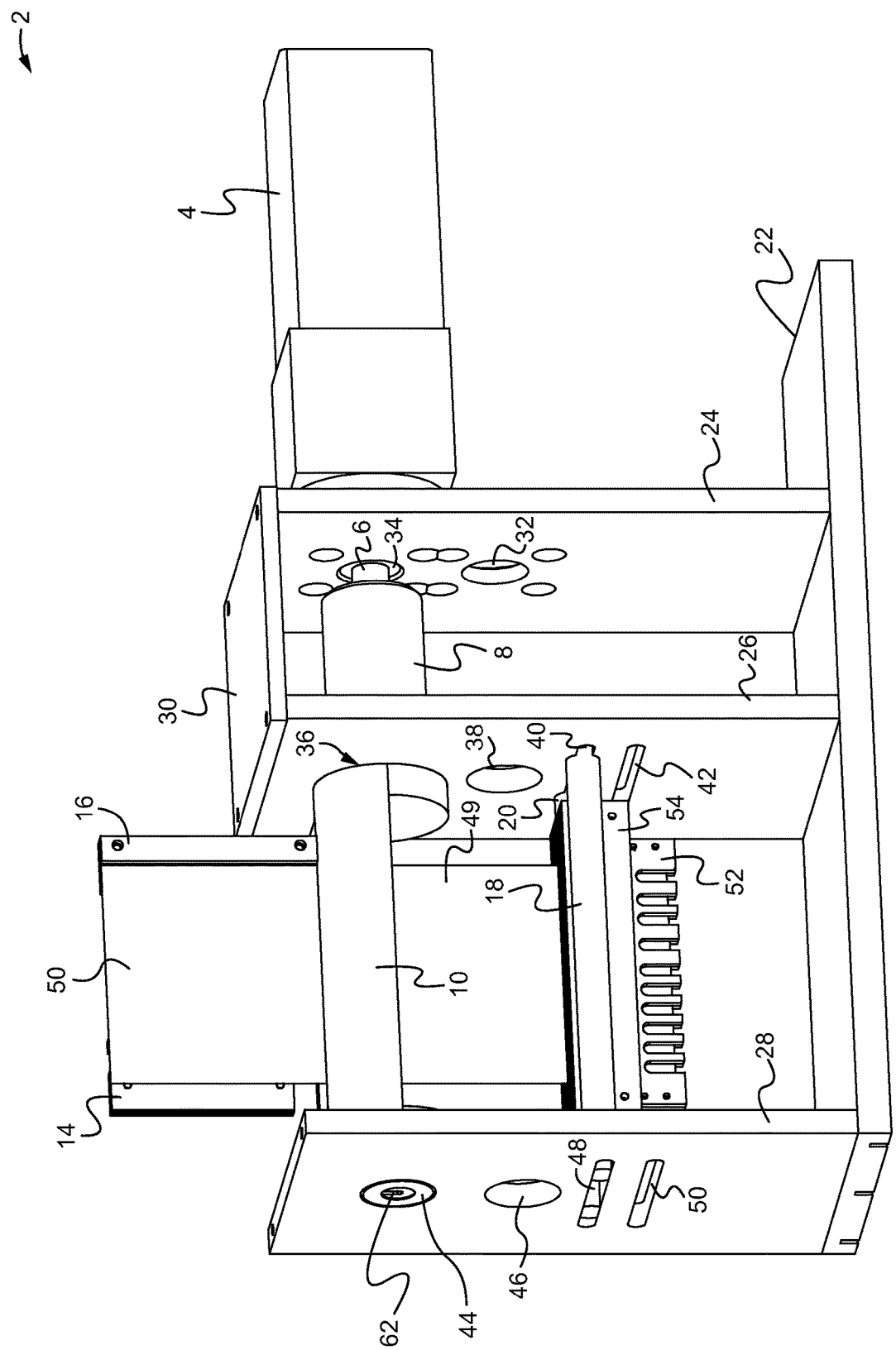
FIG. 4 illustrates a perspective rear view of the DUT mounted to the bend test device.

The nose clamp 12 is secured to the nose piece 10. In some embodiments, the nose clamp 12 is secured to the nose piece 10 by screws. It is understood that other techniques can be used for securing the nose clamp 12 to the nose piece 10. A DUT 50 is mounted to the bend test device 2 by separating the nose clamp 12 from the nose piece 10, positioning the DUT 50 between the nose piece 10 and the nose clamp 12, and re-securing the nose clamp 12 to the nose piece 10 with the DUT 50 positioned there between. FIG. 3 illustrates a perspective rear view of a DUT 50 mounted to the bend test device 2 of FIG. 1 according to some embodiments. FIG. 4 illustrates a perspective rear view of the DUT 50 mounted to the bend test device 2. In the exemplary application shown in FIG. 3, the DUT 50 is a flexible circuit board. It is understood that other types of DUTs 50 can be used. Although subsequent description is directed to a flexible circuit board, it is understood that similar teachings apply to alternative types of DUTs 50. The flexible circuit board 50 can be mounted in any relative position to the nose piece 10. In the exemplary configuration shown in FIG. 3, the flexible circuit board 50 is clamped to the nose piece 10 at substantially a mid-point of the flexible circuit board length. An upper portion of the flexible circuit board 50 is secured between the front support plate 14 and the rear support clamp 16. A lower hanging portion 49 of the flexible circuit board 50 hangs below the nose piece 10 and between the stabilizer rods 18, 20. A lower end of the flexible circuit board 50 hangs below the stabilizer rods 18, 20. A weight 54 is attached to the lower hanging portion 49 of the flexible circuit board 50 so as to maintain downward tension on the flexible circuit board 50 during the bend test, as described below. The position of the weight 54 attached to the flexible circuit board 50 and the position of the stabilizer rods 18, 20 are aligned to have the weight 54 positioned between the stabilizer rods 18, 20, as shown in FIG. 3. In some embodiments, the weight 54 is made of a number of individual weights, such as weight plates stacked together. More or less individual weights can be used to achieve a desired downward tension on the flexible circuit board 50. The lateral positions of the stabilizer rods 18, 20 within the slot openings can be adjusted to accommodate the number of individual weights used.

Figure 11:
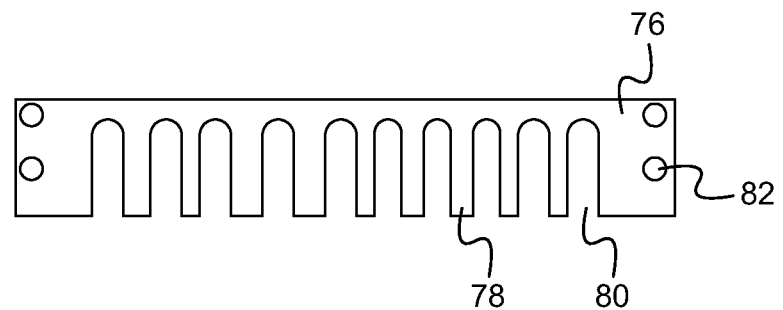
FIG. 11 illustrates a front view of the comb structure according to some embodiments.

A comb structure 52 is attached to a bottom end of the hanging flexible circuit board 50. The comb structure 52 includes fingers 78 and openings 80 between the fingers, as shown in greater detail in FIG. 11. The openings 80 are aligned with corresponding connection points on the flexible circuit board 50. A voltmeter can be attached to the connections points, via connection clips, to measure a resistance across various conductor traces on the flexible circuit board 50, for example. The comb structure 52 is made of a non-electrically conductive material, such as plastic, to provide electrical isolation between adjacently attached connection clips. The measurements taken by the voltmeter can determine whether or not a circuit in the flexible circuit board 50 becomes broken during the bend test. A configuration of the comb structure 52, including its fingers and openings, matches a corresponding configuration of the connection points on the flexible circuit board 50. In some embodiments, the comb structure 52 includes a front piece, as shown in FIG. 11, and a rear piece that is the mirror image of the front piece. The front piece is positioned on one side of the flexible circuit board 50 and the rear piece is positioned on the other side of the flexible circuit board 50. The front piece and the rear piece are secured together, for example using screws or bolts/nuts through holes 82.

The nose piece 10 and nose clamp 12 form a mandrel 13, and the flexible circuit board 50 is mounted between the nose piece 10 and the nose clamp 12. In a neutral position, the flexible circuit board 50 is unbent. FIGS. 5A-5C illustrate the bend test device 2 in the neutral position. In particular, FIG. 5A illustrates a front view of the bend test device 2 of FIG. 3 in the neutral position. FIG. 5B illustrates a side view of the bend test device 2 of FIG. 5A. FIG. 5C illustrates a cut-out side view along line A-A in FIG. 5A.

Rotation of the nose piece 10 by the motor 4 bends the flexible circuit board 50 at either a radius edge of the nose piece 10 or a radius edge of the nose clamp 12 depending on a direction of rotation, e.g. either clockwise or counter-clockwise. In an exemplary implementation of the bend test, the motor 4 is controlled to rotate 90 degrees in one direction, e.g. clockwise rotation to establish a +90 degree bend of the flexible circuit board 50, as shown in FIGS. 6A and 6B, and then to rotate 180 degrees in the other direction, e.g. counter-clockwise rotation to establish a −90 degree bend of the flexible circuit board 50, as shown in FIG. 6C, and then to rotate back 180 degrees, e.g. clockwise rotation to establish a +90 degree bend of the flexible circuit board 50, as shown in FIG. 6B. This cycle continues for as many bend cycles as programmed. The bend test can include any number of bend cycles. It is understood that alternative degrees of rotation can be used for the bend cycle. In general, the motor 4 and nose piece 10 can be configured to enable any degree of bending between +180 degrees and −180 degrees.

Figure 7:
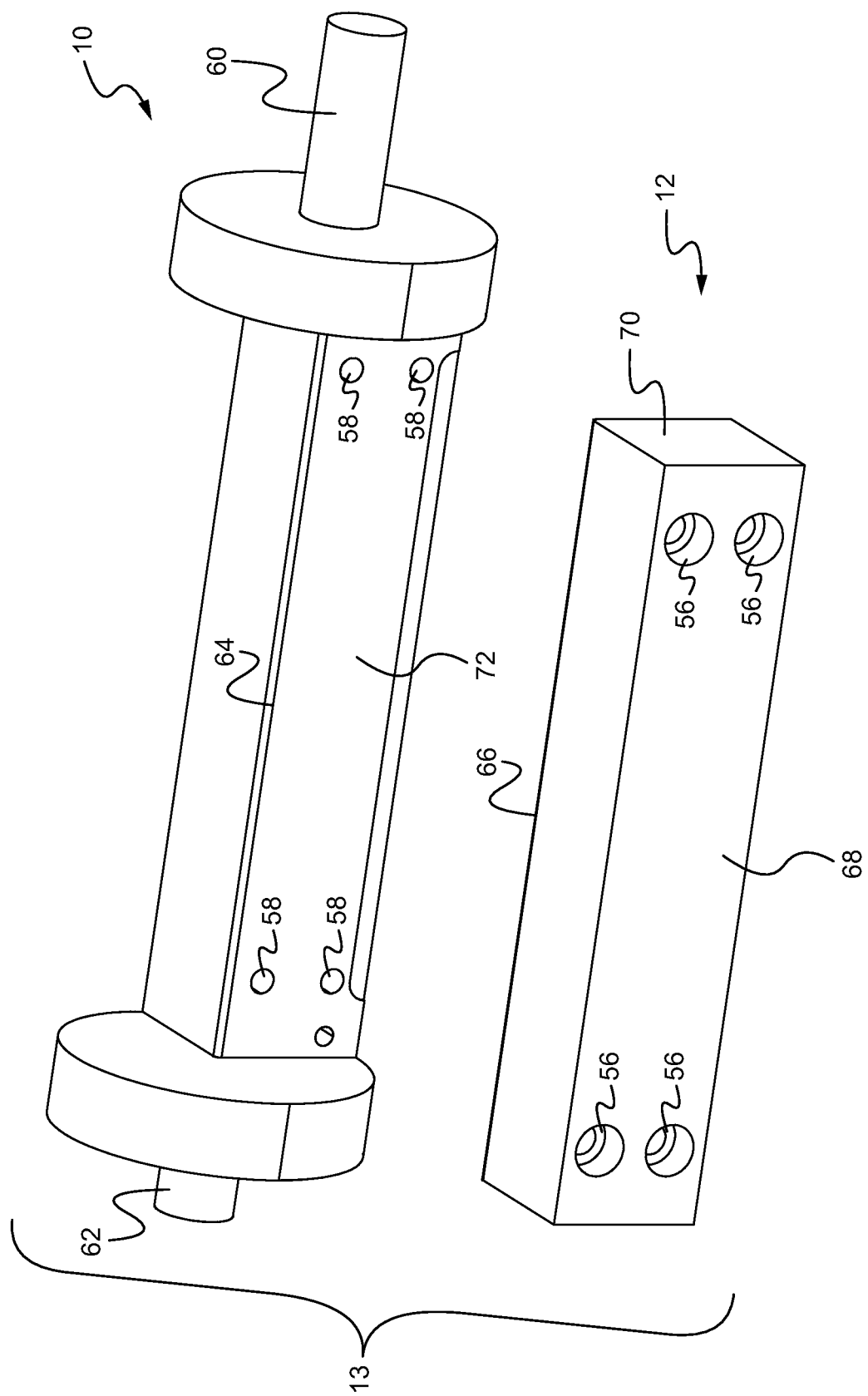
FIG. 7 illustrates an enlarged view of the nose piece and the nose clamp separated from each other.
Figure 8:
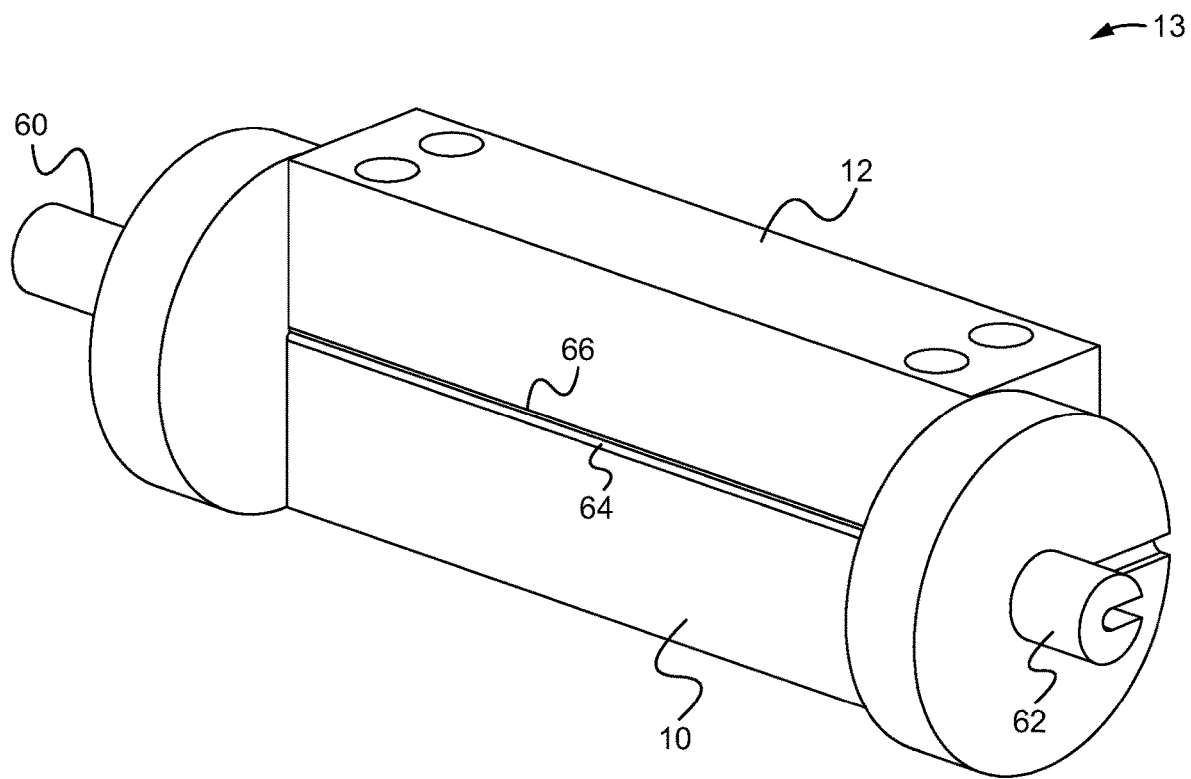
FIG. 8 illustrates an enlarged view of the nose piece and the nose clamp secured together without a mounted flexible circuit board.

FIG. 7 illustrates an enlarged view of the nose piece 10 and the nose clamp 12 separated from each other. In the exemplary configuration where the nose clamp 12 is secured to the nose piece 12 by screws, the nose piece 10 includes screw holes 58 and the nose clamp 12 includes correspondingly aligned screw hole openings 56 through which screws (not shown) can be inserted and tightened into the screw holes 58. The mounted flexible circuit board (not shown) is positioned between a surface 72 of the nose piece 10 and a surface (edge shown at 82) of the nose clamp 12. The screw holes 58 and the screw hole openings 56 are positioned so as to be outside a perimeter of the mounted flexible circuit board. The nose piece 10 includes a radius edge 64 and the nose clamp 12 includes a radius edge 66. FIG. 8 illustrates an enlarged view of the nose piece 10 and the nose clamp 12 secured together without a mounted flexible circuit board.

Figure 9A:
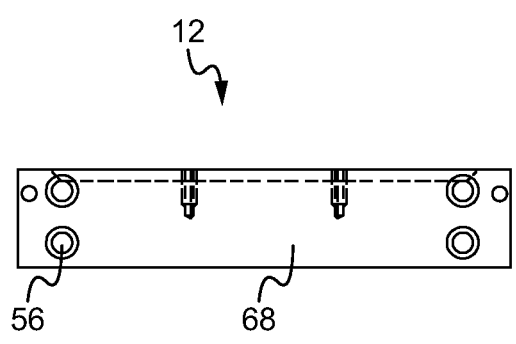
FIG. 9A illustrates a front view of the nose clamp.
Figure 9B:
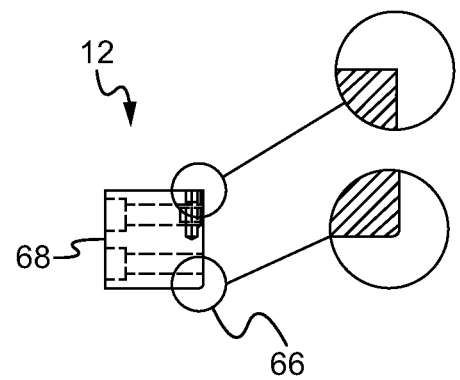
FIG. 9B illustrates a side view of the nose clamp with an enlarged view of the nose clamp radius edge.
Figure 9C:
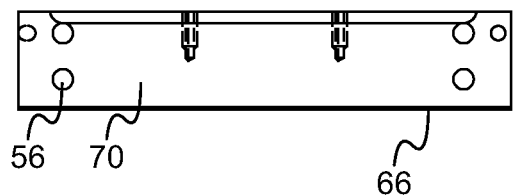
FIG. 9C illustrates a back view of nose clamp.
Figure 10A:
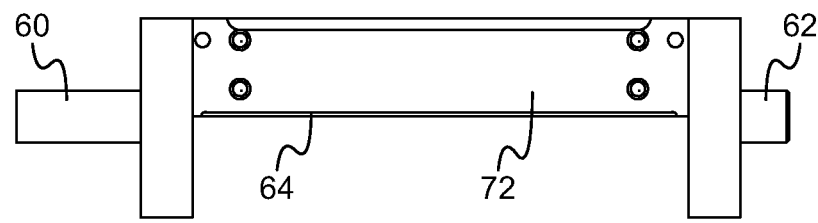
FIG. 10A illustrates a front view of the nose piece.
Figure 10B:
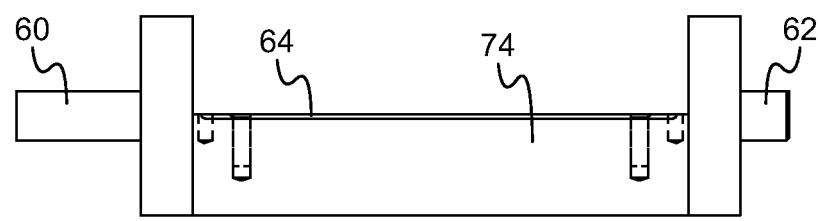
FIG. 10B illustrates a front view of the nose piece of FIG. 10A where the nose piece has been rotated 90 degrees.

Each of the radius edge 64 and the radius edge 66 have a bend radius. The bend radius of the radius edges 64, 66 determines a bend radius of the flexible circuit board 50 when the bend test is applied. For example, when the flexible circuit board 50 is bent +90 degree, such as shown in FIG. 6B, the flexible circuit board 50 is bent over the radius edge 64 of the nose piece 10, and when the flexible circuit board 50 is bent −90 degree, such as shown in FIG. 6C, the flexible circuit board 50 is bent over the radius edge 66 of the nose clamp 12. In some embodiments, the bend radius for the radius edge 64 and the bend radius for the radius edge 66 are each 1 millimeter (mm). It is understood that the radius edges of the nose piece and nose clamp can be alternatively configured such that the bend radius is greater than or less than 1 mm. FIG. 9A illustrates a front view of the nose clamp 12. FIG. 9B illustrates a side view of the nose clamp 12 with an enlarged view of the radius edge 66. FIG. 9C illustrates a back view of nose clamp 12. FIG. 10A illustrates a front view of the nose piece 10. FIG. 10B illustrates a front view of the nose piece 10 of FIG. 10A where the nose piece 10 has been rotated 90 degrees. The radius edge 64 of the nose piece 10 is similar to the radius edge 66 of the nose clamp 12 shown in FIG. 9B.

Referring again to FIGS. 1-4, the weight 54 is attached to a lower hanging portion 49 of the flexible circuit board 50 that is below the nose piece 10. The weight 54 maintains downward tension on the flexible circuit board 50 and enables the flexible circuit board 50 to properly bend over either the radius edge 64 of the nose piece 10 or the radius edge 66 of the nose clamp 12, depending on which direction the nose piece 10 is rotated, such that the flexible circuit board 50 bends to substantially the radius of the radius edge 64, 66. The relative heights of the nose piece 10 and the stabilizing rods 18, 20 can be adjusted to accommodate differently sized flexible circuit boards 50. Functionally, the stabilizing rods 18, 20 are designed to minimize swinging back and forth of the flexible circuit board 50 and attached weight 54. Swinging of the flexible circuit board 50 results in inaccurate bending, i.e. the flexible circuit board 50 bending over the radius edge 64, 66 does not accurately conform to the radius of the radius edge 64, 66. A specific weight is determined to establish the required tension on the flexible circuit board 50 to accurately conform the bending flexible circuit board 50 to the radius of the radius edge 64, 66.

Bending of the flexible circuit board 50 by rotating the mandrel 13 (the nose piece 10 and the nose clamp 12) results in the potion of the flexible circuit board 50 below the nose piece 10 oscillating up and down. In some embodiments, the bottom portion of the flexible circuit board 50, and the attached weight 54, only oscillates up and down by about 0.0013 inches for a 1 mm radius bend. In some embodiments, there is a minimal separation between the stabilizer rods 18, 20 and the weight 54 attached to the flexible circuit board 50 so as to enable slight up and down (vertical) movement of the flexible circuit board 50 and weight 54 relative to the stabilizer rods 18, 20. If, instead, the stabilizer rods 18, 20 were clamped to the weight 54 or the flexible circuit board 50, or otherwise restricted vertical movement of the flexible circuit board 50 during the bend test, the flexible circuit board 50 would actually bow slightly at the radius edge 64, 66 and not accurately conform to the designed bend radius. As such, the flexible circuit board 50 is intended to hang freely between the stabilizing rods 18 and 20. The gap between the weight 50 and the stabilizer rods 18, 20 is minimized as much as possible. In some embodiments, the ends of each stabilizer rod 18, 20 are secured in position within the slot openings of the end support plate and the mid support plate by screws, e.g. thumb screws, which can be loosened and re-tightened to enable the position of the stabilizer rods 18, 20 to be laterally adjusted, either increasing or decreasing the gap between the weight 54 and the stabilizer rods 18, 20.

Figure 12:
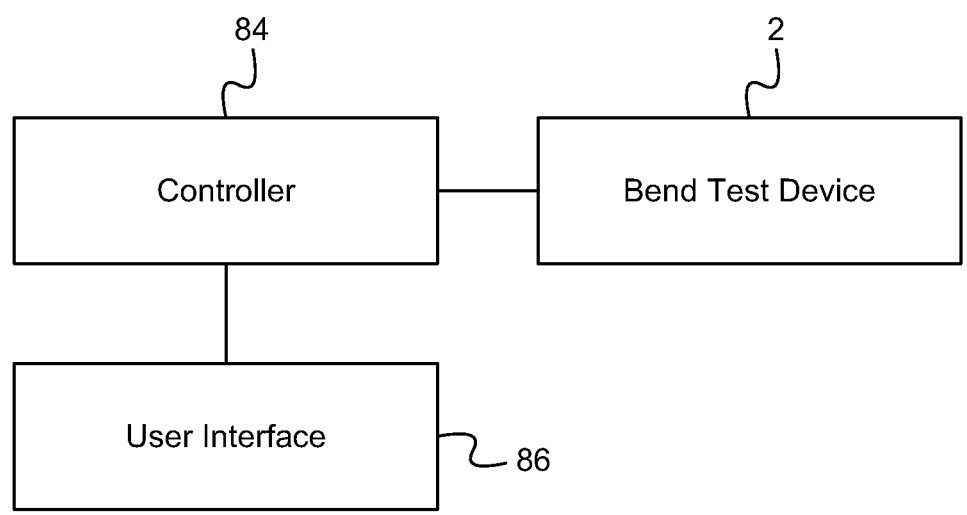
FIG. 12 illustrates a functional block diagram of a bend test system according to some embodiments.

In some embodiments, the bend test device is implemented as part of a bend test system that includes a controller 84 for controlling operation of the motor 4. FIG. 12 illustrates a functional block diagram of a bend test system according to some embodiments. The bend test system includes the bend test device 2, a controller 84, and a user interface 86. The controller 84 is coupled to the motor 4 of the bend test device 2 and includes programmable control logic and circuitry for implementing programmed instructions and providing corresponding control signaling to the motor 4. In some embodiments, the controller 84 determines the speed of the motor (translates to the speed of bending the flexible circuit board), the degrees of rotation for each bend, and the bend cycle count. The user interface 86 provides means for a user to interface with the controller 84 and provide start/stop commands and/or parameter values to be executed with the programmed instructions.

The present application has been described in terms of specific embodiments incorporating details to facilitate the understanding of the principles of construction and operation of the bend test device and bend test method. Many of the components shown and described in the various figures can be interchanged to achieve the results necessary, and this description should be read to encompass such interchange as well. As such, references herein to specific embodiments and details thereof are not intended to limit the scope of the claims appended hereto. It will be apparent to those skilled in the art that modifications can be made to the embodiments chosen for illustration without departing from the spirit and scope of the application.

What is claimed is:

1. A bend test device comprising:
   a. a motor;
   b. a mandrel coupled to the motor, wherein the mandrel includes a first radius edge having a defined radius and a second radius edge having the defined radius;
   c. a mounting structure coupled to the motor and to the mandrel; and
   d. a device under test coupled to the mandrel, wherein the device under test is a flexible circuit board;
   wherein the motor and mandrel are configured to rotate in a first direction and a second direction, when rotated in the first direction the device under test bends over the first radius edge and when rotated in the second direction the device under test bends over the second radius edge.

2. The bend test device of claim 1, wherein the device under test is coupled to the mandrel such that a hanging portion of the device under test hangs below the mandrel.

3. The bend test device of claim 2, further comprising a weight coupled to the hanging portion of the device under test.

4. The bend test device of claim 3, further comprising a pair of stabilizer rods coupled to the mounting structure, wherein the weight is positioned between the stabilizer rods.

5. The bend test device of claim 4, wherein the hanging portion of the device under test and the weight are free-hanging.

6. The bend test device of claim 3, wherein the weight maintains a downward tension of the hanging portion of the device under test to enable bending of the device under test to conform to the radius of the first radius edge and the second radius edge of the mandrel.

7. The bend test device of claim 3, wherein the mounting structure comprises a first set of openings for mounting the motor and the mandrel, and a second set of openings for mounting the stabilizer rods, further wherein the motor and the mandrel are adjustably positioned by positioning the motor and the mandrel in select ones of the first set of openings, and the stabilizer rods are adjustably positioned by positioning the stabilizer rods in select ones of the second set of openings, wherein the motor, the mandrel, and the stabilizer rods are adjustably positioned to adjust a relative separation distance between the mandrel and the stabilizer rods.

8. The bend test device of claim 7, further comprising a support structure mounted to the second side of the mandrel and to the second end of the device under test.

9. The bend test device of claim 8, wherein the motor comprises a drive shaft and the nose piece comprises a bearing coupled to the drive shaft.

10. The bend test device of claim 8, wherein the nose piece comprises the first radius edge and the nose clamp comprises the second radius edge.

11. The bend test device of claim 2, wherein the device under test has a first end and a second end opposite the first end, the hanging portion of the device under test includes the first end, further wherein the device under test is coupled to the mandrel such that the first end extends from a first side of the mandrel and the second end extends from a second side of the mandrel.

12. The bend test device of claim 1, wherein the mandrel comprises a nose piece and a nose clamp, further wherein the device under test is mounted and secured between the nose piece and the nose clamp.

13. The bend test device of claim 1, further comprising a controller coupled to the motor.

14. The bend test device of claim 13, wherein the controller comprises control logic for implementing programmed instructions including a first number of degrees to be rotated in the first direction and a second number of degrees to be rotated in the second direction, and a number of bend cycles to be performed.

15. A bend test device comprising:
   a. a motor;
   b. a mandrel comprising a nose piece and a nose clamp, wherein the nose piece includes a first radius edge having a defined radius and the nose clamp includes a second radius edge having the defined radius;
   c. a mounting structure coupled to the motor and to the mandrel;
   d. a pair of stabilizer rods coupled to the mounting structure;
   e. a device under test coupled to the mandrel, wherein the device under test is mounted and secured between the nose piece and the nose clamp, and a hanging portion of the device under test hangs below the mandrel;
   f. a weight coupled to the hanging portion of the device under test, wherein the weight is positioned between the stabilizer rods; and
   g. a controller coupled to the motor,
   wherein the motor and mandrel are configured to rotate in a first direction and a second direction, when rotated in the first direction the device under test bends over the first radius edge and when rotated in the second direction the device under test bends over the second radius edge, further wherein the control circuit comprises control logic for implementing programmed instructions including a first number of degrees to be rotated in the first direction and a second number of degrees to be rotated in the second direction, and a number of bend cycles to be performed.

\* \* \* \* \*